United States Patent
Khokhlov (10) Patent No.: US 10,564,683 B2
(45) Date of Patent: *Feb. 18, 2020

(54) HANDHELD ELECTRONIC DEVICE FOR RECEIVING AND DISPLAYING STATUS INFORMATION

(71) Applicant: SONY CORPORATION, Tokyo (JP)

(72) Inventor: Vladimir Khokhlov, London (GB)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/153,283

(22) Filed: Oct. 5, 2018

(65) Prior Publication Data

US 2019/0050029 A1 Feb. 14, 2019

Related U.S. Application Data

(63) Continuation of application No. 15/888,968, filed on Feb. 5, 2018, now Pat. No. 10,133,318, which is a (Continued)

(30) Foreign Application Priority Data

Feb. 6, 2009 (GB) .................................. 0902024.9

(51) Int. Cl.
 *H04W 24/00* (2009.01)
 *G06F 1/16* (2006.01)
 (Continued)

(52) U.S. Cl.
 CPC .......... *G06F 1/1694* (2013.01); *G06F 1/1626* (2013.01); *G06F 1/1643* (2013.01);
 (Continued)

(58) Field of Classification Search
 CPC .... G06F 1/1626; G06F 1/1643; G06F 1/1694; G06F 3/017; G06F 3/0481;
 (Continued)

(56) References Cited

U.S. PATENT DOCUMENTS

| 5,815,814 A | 9/1998 | Dennison et al. |
| 6,584,320 B1 | 6/2003 | Kawamoto |

(Continued)

FOREIGN PATENT DOCUMENTS

| CN | 1797536 A | 7/2006 |
| CN | 101022429 A | 8/2007 |

(Continued)

OTHER PUBLICATIONS

Office Action dated Jul. 11, 2013 in Chinese Patent Application No. 201010119144.0 (with English translation).

(Continued)

*Primary Examiner* — Ronald Eisner
(74) *Attorney, Agent, or Firm* — Oblon, McClelland, Maier & Neustadt, L.L.P.

(57) ABSTRACT

PDAs can be used to provide their users with various functions. One such function is the ability to contact other users who are stored in the PDA as contacts, for example by telephone of text message. The decision as to whether or not a particular user should be contacted may be influenced by the location of that user. For example, if a contact is nearby, then it may be more likely that the user of the PDA would want to contact them. The present embodiments provide a PDA on which the location of one or more contacts can be displayed. Furthermore, the location of a particular contact can be shown on a map on the screen of the PDA simply by tilting the PDA through a predetermined angle about a horizontal axis. Thus, the map can be displayed in an intuitive and straightforward manner.

23 Claims, 3 Drawing Sheets

Related U.S. Application Data continuation of application No. 15/489,349, filed on Apr. 17, 2017, now Pat. No. 10,007,305, which is a continuation of application No. 14/330,973, filed on Jul. 14, 2014, now Pat. No. 9,651,988, which is a continuation of application No. 12/618,898, filed on Nov. 16, 2009, now Pat. No. 8,831,644.

(51) Int. Cl.
| | |
|---|---|
| *H04W 4/21* | (2018.01) |
| *H04W 4/029* | (2018.01) |
| *G06F 3/01* | (2006.01) |
| *G06F 3/0481* | (2013.01) |
| *H04M 1/2745* | (2020.01) |
| *H04L 29/08* | (2006.01) |
| *H04L 12/58* | (2006.01) |
| *H04W 4/02* | (2018.01) |
| *H04W 4/18* | (2009.01) |
| *G06F 3/0484* | (2013.01) |
| *G06Q 10/10* | (2012.01) |

(52) U.S. Cl.
CPC ............ *G06F 3/017* (2013.01); *G06F 3/0481* (2013.01); *G06F 3/04842* (2013.01); *H04L 51/20* (2013.01); *H04L 67/24* (2013.01); *H04L 67/26* (2013.01); *H04M 1/27455* (2013.01); *H04W 4/023* (2013.01); *H04W 4/029* (2018.02); *H04W 4/18* (2013.01); *H04W 4/21* (2018.02); *G06Q 10/10* (2013.01); *H04L 67/10* (2013.01); *H04L 67/14* (2013.01)

(58) Field of Classification Search
CPC .... G06F 3/04842; G06Q 10/10; G06Q 10/06; G06Q 50/01; H04L 51/20; H04L 67/10; H04L 67/14; H04L 67/24; H04L 67/26; H04L 51/32; H04L 12/5865; H04L 67/306; H04M 1/27455; H04W 4/023; H04W 4/029; H04W 4/18; H04W 4/21; H04W 4/02; H04W 64/00; H04W 4/028; H04W 4/04; H04W 4/00; H04W 4/206; Y04S 10/54

See application file for complete search history.

(56) References Cited

U.S. PATENT DOCUMENTS

| | | | |
|---|---|---|---|
| 7,970,384 | B1 | 6/2011 | Lambert et al. |
| 8,244,279 | B2 | 8/2012 | Dicke et al. |
| 2002/0075335 | A1 | 6/2002 | Rekimoto |
| 2003/0073440 | A1 | 4/2003 | Mukherjee et al. |
| 2005/0108348 | A1 | 5/2005 | Lee |
| 2005/0165920 | A1 | 7/2005 | Kerr et al. |
| 2006/0063539 | A1 | 3/2006 | Beyer, Jr. |
| 2006/0240866 | A1 | 10/2006 | Eilts |
| 2006/0281453 | A1 | 12/2006 | Jaiswal et al. |
| 2007/0050129 | A1 | 3/2007 | Salmre |
| 2007/0259717 | A1 | 11/2007 | Mattice et al. |
| 2007/0281607 | A1 | 12/2007 | Bucher et al. |
| 2008/0089264 | A1 | 4/2008 | Kim et al. |
| 2008/0133580 | A1 | 6/2008 | Wanless et al. |
| 2008/0182589 | A1* | 7/2008 | Buccieri ................ H04W 8/14 455/456.3 |
| 2008/0281511 | A1 | 11/2008 | Miyata |
| 2009/0028179 | A1 | 1/2009 | Albal |
| 2010/0106782 | A1 | 4/2010 | Huang et al. |

FOREIGN PATENT DOCUMENTS

| | | | | |
|---|---|---|---|---|
| EP | 1 071 295 | A2 | 1/2001 | |
| EP | 1 071 295 | A3 | 1/2001 | |
| EP | 1 176 840 | A1 | 1/2002 | |
| EP | 1 686 450 | A2 | 8/2006 | |
| EP | 1 802 145 | A1 | 6/2007 | |
| EP | 1 840 521 | A2 | 10/2007 | |
| EP | 1 840 521 | A3 | 10/2007 | |
| EP | 1 862 921 | A1 | 12/2007 | |
| EP | 1 933 574 | A1 | 6/2008 | |
| EP | 1 993 270 | A1 | 11/2008 | |
| EP | 2214387 | A1 * | 8/2010 | ........ H04M 1/72536 |
| EP | 2214387 | A1 | 8/2010 | |
| WO | WO 03/028345 | A1 | 4/2003 | |
| WO | WO 2007/140411 | A2 | 12/2007 | |
| WO | WO 2007/140411 | A3 | 12/2007 | |
| WO | WO 2008/025472 | A1 | 3/2008 | |
| WO | WO 2008/066960 | A1 | 6/2008 | |
| WO | WO 2008/079707 | A2 | 7/2008 | |
| WO | WO 2009/002312 | A1 | 12/2008 | |

OTHER PUBLICATIONS

Lisa Kramer, et al., "GeoRSS", Wikipedia, the free encyclopedia, Retrieved from the Internet: URL:http://em.wikipedia.org/w/index.php?title+GeoRSS&oldid=257079626>, XP002577926, Dec. 10, 2008; pp. 1-4.

Examination Report dated Jan. 26, 2011, in European Patent Application No. 09 252 436.2-1238.

Search Report dated May 8, 2009, in British Patent Application No. GB0902025.6.

Search Report dated Apr. 26, 2010 in European Patent Application No. 09252436.2-1238.

\* cited by examiner

HANDHELD ELECTRONIC DEVICE FOR RECEIVING AND DISPLAYING STATUS INFORMATION

CROSS-REFERENCE TO RELATED APPLICATIONS

This application is a continuation of and claims the benefit under 35 U.S.C. § 120 from, U.S. application Ser. No. 15/888,968, filed Feb. 5, 2018, which is a continuation of and claims the benefit under 35 U.S.C. § 120 from, U.S. application Ser. No. 15/489,349, filed Apr. 17, 2017, now U.S. Pat. No. 10,007,305, issued Jun. 26, 2018, which is a continuation of and claims the benefit under 35 U.S.C. § 120 from, U.S. application Ser. No. 14/330,973, filed Jul. 14, 2014, now U.S. Pat. No. 9,651,988, issued May 16, 2017, which is a continuation of and claims the benefit under 35 U.S.C. § 120 from, U.S. application Ser. No. 12/618,898, filed Nov. 16, 2009, now U.S. Pat. No. 8,831,644, issued Sep. 9, 2014, which claims the benefit of priority under 35 U.S.C. § 119 from United Kingdom patent application number GB 0902024.9 filed 6 Feb. 2009, the entire contents of all of these documents are incorporated by reference.

BACKGROUND OF THE INVENTION

Field of the Invention

The present invention relates to a personal digital assistant (PDA), in particular to a PDA for interacting with personal contacts. The present invention also relates to a method of interacting with personal contacts using a PDA.

Description of the Related Art

PDAs currently enable their users to perform various functions. For example, PDAs can be used to organise events (for example by providing an electronic diary); connect to the internet; listen to music; take and/or view photographs; watch videos; provide directions (for example through GPS) and produce and edit documents. PDAs can also be used to store contact details, such as postal addresses, e-mail addresses, and telephone numbers. As such, the PDAs can contain an electronic address book. Typically, PDAs can be used to view and select contacts to interact with, and can allow the user of the PDA to interact with the selected contact, for example by telephone or e-mail.

The present invention recognises that contacts in an address book of a PDA are presently arranged in an arbitrary order. For example, they may be arranged in alphabetical order. However, the user of the PDA is not provided with any additional information about the current status of their contacts.

The invention is described herein in relation to a PDA. However, the invention may comprise, and/or be used with or applied to any electronic device. In particular, the invention may comprise, and/or be used with or applied to, any mobile and/or handheld device, such as, for example, a smartphone, a netbook or a laptop computer.

SUMMARY OF THE INVENTION

According to the present invention there is provided a handheld electronic device comprising:
a substantially planar screen configured to display information to a user of the handheld electronic device; and
a tilt sensor for use in determining the angle between the substantially planar screen and the horizontal, wherein the handheld electronic device is configured to:
display information relating to pre-defined users of other electronic devices on the substantially planar screen;
operate in a mapping mode when the angle between the substantially planar screen and the horizontal is in a pre-defined range; and
show the location of the electronic device of a pre-defined user of another electronic device on the substantially planar screen when operating in the mapping mode.

The handheld electronic device as described above enables its user to easily access a mapping mode that enables the user to find out the location of their contacts, or of particular selected contacts. The mapping mode may be accessible simply by tilting, or rotating the handheld electronic device (such as a PDA). As such, the user is not required to either remove their hands from the device, or press any particular buttons. Knowing the location of a particular user (or users) of another electronic device enables the user of the handheld electronic device to make a more informed decision about, for example, whether they would like to make contact (for example by way of telephone call) with the other user. Of course, showing the location of the electronic device of a pre-defined user of another electronic device on the substantially planar screen also includes the possibility of showing the location of at least one pre-defined user of another electronic handheld device on the substantially planar screen.

According to another aspect of the invention, the handheld electronic device may be further configured to display status information about the electronic device of said pre-defined user. This enables the user of the handheld electronic device to make a still more informed decision regarding whether they would like to make contact with the other user, based on the status of their contact's device.

According to another aspect of the invention, the status information may comprise at least one of:
(i) what function the electronic device is performing; and
(ii) the power status of the electronic device.

This status information may be particularly useful for the user of the handheld electronic device to know. For example, it may be that the electronic device of the other user is being used to perform the same function as that being performed by the handheld electronic device, and thus may be more likely to be contacted. Alternatively, if the electronic device of the other user is known to be turned off, then the user of the handheld electronic device would be less likely to try to contact them.

According to an aspect of the invention, the function may include at least one of:
displaying videos;
displaying photographs;
taking photographs;
playing music;
sending emails;
accessing the internet;
playing games;
acting as a telephone.

It may be particularly useful to the user of the handheld electronic device to know if the user of another electronic device is performing one of the above function, for example in determining whether they want to contact them. For example, if the other user is playing a game, then they may wish to join in that game, for example over the internet. This list of functions is not exhaustible, and may be expanded to include any other function that the handheld electronic device may be configured to perform.

According to an aspect of the invention, the handheld electronic device may be configured to obtain information regarding the electronic device of the pre-defined user from a server.

Obtaining the information from a server means that information about more than one other electronic device can be obtained in an efficient manner.

According to an aspect of the invention, the handheld electronic device may be configured to obtain the information from the server as XML data forming an RSS feed.

Obtaining the information through XML data (for example XML packets) in an RSS feed further improves the efficiency of obtaining the information, especially from more than one other electronic device.

According to an aspect of the invention, the obtained information may comprise information relating to the location of the electronic device of said pre-defined user.

This aspect enables the location of the pre-defined user to then subsequently be displayed on the screen of the handheld electronic device.

According to an aspect of the invention, the handheld electronic device may further comprise a receiver unit configured to receive information regarding said pre-defined users of other electronic devices.

Such a receiver unit enables the handheld electronic device to receive information regarding other electronic devices directly.

According to an aspect of the invention, the handheld electronic device may further comprise locating means for determining its own location.

This enables the handheld electronic device to (i) determine, and display to its user, its own position relative to the position of other electronic devices; and (ii) subsequently send its own position to other electronic devices.

The locating means may use a triangulation method. Using a triangulation method may ensure that the determined position is suitably accurate.

The locating means may use a Global Navigation Satellite System (GLASS), an example of which is Global Positioning System (GPS).

According to an aspect of the invention, the handheld electronic device may further comprise a transmitter unit configured to transmit information from the handheld electronic device.

This enables the handheld electronic device to transmit information about itself to other electronic devices. The users of other electronic devices may then use the transmitted information to help determine, for example, whether they should contact the user of the handheld electronic device.

The transmitter unit may be configured to transmit information in the form of an RSS feed. Such an RSS feed is a particularly efficient means of transmitting information, for example to a server.

According to an aspect of the invention, the transmitter unit may be configured to transmit information regarding at least one of:
  (i) the location of the handheld electronic device; and
  (ii) the status of the handheld electronic device.

This information may be particularly useful to the users of other electronic devices in deciding upon, for example, whether they should contact the user of the handheld electronic device.

According to an aspect of the invention, the transmitted status information may comprise at least one of:

(i) what function the handheld electronic device is performing; and
  (ii) the power status of the handheld electronic device.

Again, this information may be particularly useful to the users of other electronic devices. For example, if the handheld electronic device of the user is known to be turned off, then the user of the other electronic device would be less likely to try to contact them.

According to an aspect of the invention, the function may include at least one of:
  displaying videos;
  displaying photographs;
  taking photographs;
  playing music;
  sending emails;
  accessing the internet;
  acting as a telephone.

These functions may further assist the user of the other electronic device in deciding whether or not to contact the user of the handheld electronic device. This list of functions is not exhaustible, and may be expanded to include any other function that the handheld electronic device may be configured to perform.

According to an aspect of the invention, the tilt sensor may be arranged to measure the angle between the substantially planar screen and the horizontal directly. According to this aspect, there is no requirement for any processing to be performed to calculate the angle between the planar screen and the horizontal.

According to an aspect of the invention, the tilt sensor may comprise a gyroscope. Tilt sensors comprising gyroscopes are particularly readily available and may be of suitable accuracy.

According to an aspect of the invention, the handheld electronic device may be configured to provide one or more of the following functions:
  displaying videos;
  displaying photographs;
  taking photographs;
  playing music;
  sending emails;
  accessing the internet;
  providing a telephone function;
  acting as a navigation device;
  playing games;
  acting as an electronic diary.

Providing at least one of the above functions enables the user of the handheld electronic device to perform a variety of functions on the same device, thereby minimizing the number of electronic devices that need to be carried about their person.

According to an aspect of the invention, the pre-defined user, whose electronic device location is displayed when the handheld electronic device is in mapping mode, is a user who has been selected on the substantially planar screen prior to the handheld electronic device entering the mapping mode.

According to this aspect of the invention, the user of the handheld electronic device is able to specifically select the other user whose location is to be displayed in the mapping mode.

According to an aspect of the invention, the handheld electronic device is configured such that, in mapping mode, the location of the electronic devices of more than one of the pre-defined users can be displayed.

According to an aspect of the invention, the handheld electronic device may be configured such that, in mapping mode, the location of a predetermined number of geographically closest contacts can be displayed. This means that the user of the handheld electronic device can readily determine if any contact, or enough contacts, are near enough to them to consider meeting with.

Displaying the location of the electronic devices of more than one of the pre-defined users enables the user of the handheld electronic device to make decisions regarding whether or not they wish to contact particular users from the information displayed on a single screen at a given time.

According to an aspect of the invention, the substantially planar screen is rigidly mounted in the handheld electronic device, such that the angle between the substantially planar screen and the horizontal is the same as the angle between the handheld electronic device and the horizontal. This means that the user can rotate the whole device in order to access the mapping mode, thereby improving usability.

Any suitable angle to the horizontal can be chosen as the angle at which the handheld electronic device enters the mapping mode. Thus, the mapping mode can be operational over a suitable range of angles.

According to an aspect of the invention, the predefined range is between 0 degrees and ±45 degrees.

According to an aspect of the invention, the predefined range is between 0 degrees and ±30 degrees.

According to an aspect of the invention, the predefined range is between 0 degrees and ±15 degrees.

According to an aspect of the invention, the predefined range is between 0 degrees and ±10 degrees.

According to an aspect of the invention, the predefined range is between 0 degrees and ±5 degrees.

According to an aspect of the invention, the handheld electronic device is configured to operate in the mapping mode when the angle between the substantially planar screen and the horizontal is substantially zero degrees.

According to one aspect of the invention, there is provided a method of viewing on a substantially planar screen of a handheld electronic device, the location of an electronic device belonging to a pre-defined user, the method comprising:

selecting a pre-defined user whose electronic device location is to be displayed;

tilting the substantially planar screen so that its angle to the horizontal is within a predefined range; and automatically displaying a map showing the location of the electronic device of the pre-defined user on the substantially planar screen when said angle is within said pre-defined range.

By using such a method, the user of a suitable handheld electronic device is able to view the location of their contacts in a simple and efficient manner.

According to an aspect of the invention, the step of tilting the substantially planar screen comprises tilting the handheld electronic device itself. This further enhances the ease by which the user can enter the mapping mode, because they are simply required to tilt, or rotate, the device as a whole.

According to an aspect of the invention, the step of tilting comprises rotating the handheld electronic device about an axis that lies substantially horizontal and substantially parallel to the plane of the planar screen. This is a particularly intuitive axis about which the user might want to tilt the handheld electronic device, for example to take the screen from a substantially vertical orientation to a substantially horizontal orientation.

DETAILED DESCRIPTION OF THE PREFERRED EMBODIMENTS

The invention will be more clearly understood from the following description, given by way of example only, with reference to the accompanying drawings.

Figure 1:
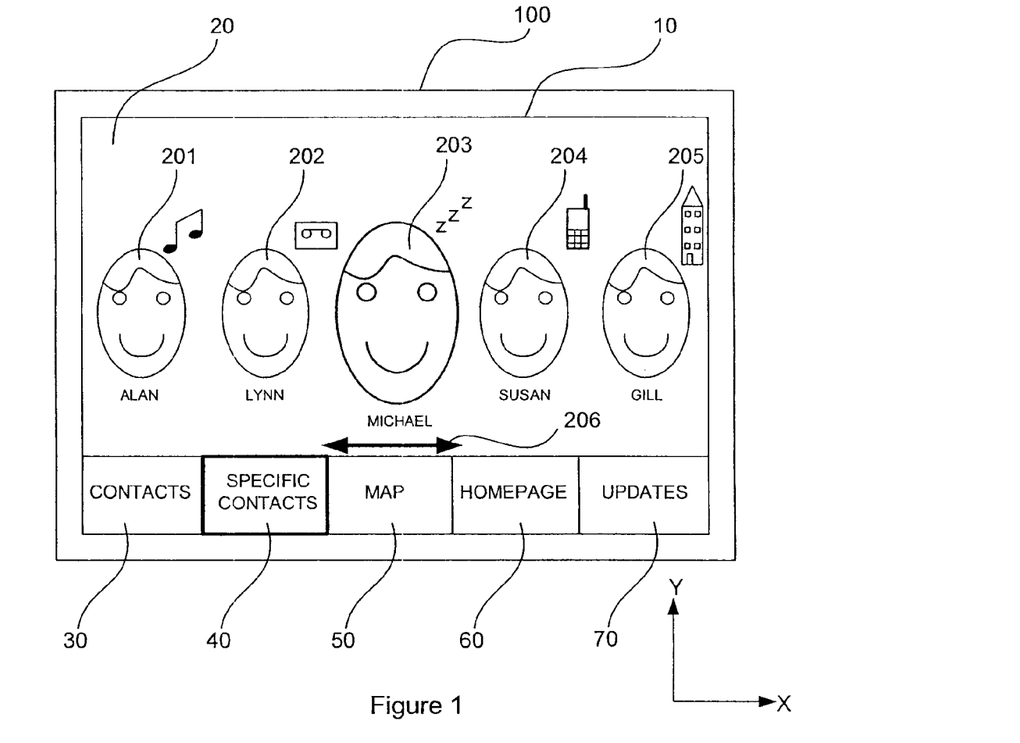
FIG. 1 shows a front view of a PDA according to an embodiment of the present invention on which a specific contacts screen is being displayed.

FIG. 1 shows a PDA 100 according to an embodiment of the present invention. In the embodiment shown in FIG. 1, a display screen 10 is provided on the PDA 100. This display screen 10 is divided into two main areas. A first area 20 shows the currently selected function (these functions will be described herein). The second area, shown in the FIG. 1 embodiment as being towards a lower portion of the screen, contains various other selectable functions, shown in boxes 30, 40, 50, 60 and 70. Once selected, the selectable functions in boxes 30, 40, 50, 60 and 70 are displayed in the first area (which may also be referred to as the main window) 20.

Figure 2:
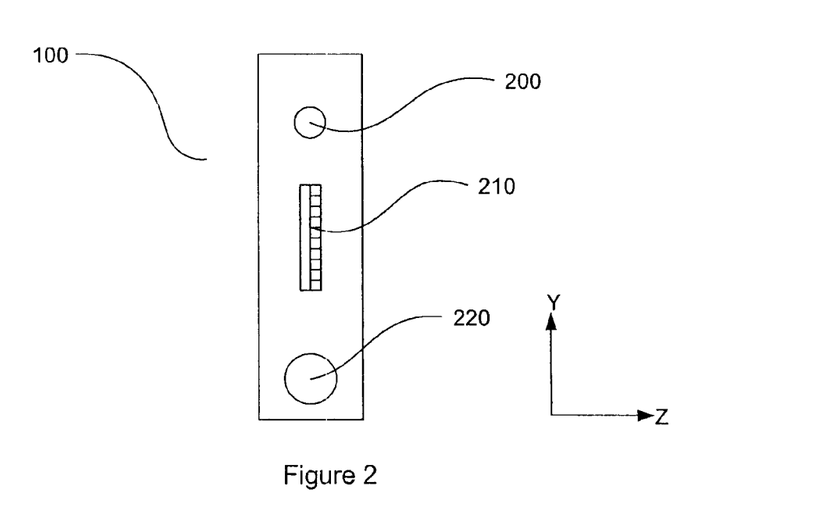
FIG. 2 shows a side view of a PDA according to an embodiment of the present invention.

FIG. 2 shows a side view of the PDA 100 shown in FIG. 1. As can be seen in FIG. 2, various input and/or output ports and/or sockets may be provided on a side of the PDA 100. Such ports/sockets could include, for example, a headphone socket 200, a USB port 210, and a power socket 220. Other typical input and/or output ports and/or sockets may also be provided on a PDA. Furthermore, in some embodiments, one, more than one, or all of the sockets and/or ports may be provided on the front, rear, top or bottom of the PDA rather than, or in addition to, on the side.

The PDA 100 may comprise a controller, which may comprise a processor, and/or a storage device and/or RAM. The controller may be used to control the various functions of the PDA 100 described below.

Referring back to FIG. 1, as explained above, the PDA 100 may be configured to display a variety of different operation modes in the main window 20 by selecting the appropriate function 30-70 in the lower half of the PDA screen 10. In the example shown in FIG. 1, the operation modes include: "contacts" (accessed by selecting area 30); "specific contacts" (accessed by selecting area 40); "map" (accessed by selecting area 50); "home page" (accessed by selecting area 60); and "updates" (accessed by selecting area 70). Various other operation modes may also be available for selection.

In FIG. 1, the main window 20 is depicted displaying specific contacts. This can be seen by the specific contacts area 40 being highlighted. When the specific contacts screen is being displayed, various contacts 201-205 of the user of PDA 100 are shown in the main window 20. However, as will be described in detail below, not all of the contacts available to the user of the PDA 100 may necessarily be accessible via the specific contacts screen. The contacts that are displayed in the specific contacts screen may be tailored to the needs of the user at a given time.

Each contact 201-205 may be displayed as an avatar. In FIG. 1, each avatar 201-205 is shown as being identical. However, in some embodiments, each avatar could be specific to the contact. For example, each avatar could be a drawing of the contact. Alternatively, any other suitable image may be displayed for the specific contacts, such as a photograph of them. For example, the name of the contact could be used instead of, or in addition to, an avatar. In the embodiment shown in FIG. 1, the specific contacts are shown with both names and avatars.

In addition to showing the specific contact (as, for example, an avatar 201-205), the specific contact screen may also show the status of each specific contact. For example, the specific contact main window 20 may show details of what activity is being performed by the PDA of each specific contact. For example, in the specific contact main window 20 shown in FIG. 1, the avatar 201 is shown with a musical note next to it, indicating that Alan is listening to music. Similarly, avatars 202, 203 and 204 are shown with a video tape, a "zzz" symbol, and a telephone symbol next to them respectively. This indicates that Lynn is using her PDA to watch a video clip, Michael's PDA is currently in sleep mode, and Susan is using her PDA to make a telephone call.

Alternatively or additionally, the status of the specific contacts could indicate the geographical location of those contacts. For example, Gill's avatar 205 is shown with an office block next to it, indicating that Gill is at her work location. In some embodiments, more than one status icon may be shown next to a given avatar. For example, a contact may be both at work and listening to music, and thus have an "at work" and a "listening to music" icon next to their avatar. However, in other embodiments, only one status icon may be shown such that, for example, if a contact is both at work and listening to music, only the "listening to music" icon is shown. Indeed, as explained below, in FIG. 1, all of the contacts may be at their place of work, even though only one of them (Gill) is shown having an "at work" icon.

A particular contact in the specific contacts window can be highlighted for selection by scrolling through the various avatars. This scrolling can be achieved by tilting the PDA 100 about the z axis (as described below in relation to the main window 20 displaying the contacts screen shown in FIG. 3). Alternatively, the scrolling can be achieved by the user scrolling across a touch-sensitive input device (such as a touchpad, not shown) using their finger or an input stylus. Alternatively still, the scrolling could be achieved by the user scrolling across the main window 20 itself using their finger or an input stylus, for example in the area shown by arrow 206 in screen 20. Alternatively still, the scrolling could be achieved using buttons (also not shown) provided on the PDA 100.

When a particular contact is highlighted for selection, its appearance may change. This enables the user of the PDA 100 to readily identify which contact is highlighted for selection. For example, in the embodiment shown in FIG. 1, the contact 203 (Michael) is shown larger than the other contacts on the screen, indicating that this contact is highlighted for selection.

The choice of which contacts are displayed in the specific contacts main window 20 may be tailored to the needs of the user of the PDA 100. This tailoring process will be described in detail in a subsequent part of the description.

As explained above, if the specific contacts function of the PDA 100 is selected, then the main window 20 of the PDA 100 may appear as shown in FIG. 1. If, on the other hand, the contacts function of the PDA 100 is selected, then the screen 10 of the PDA 100 may appear as shown in FIG. 3.

Figure 3:
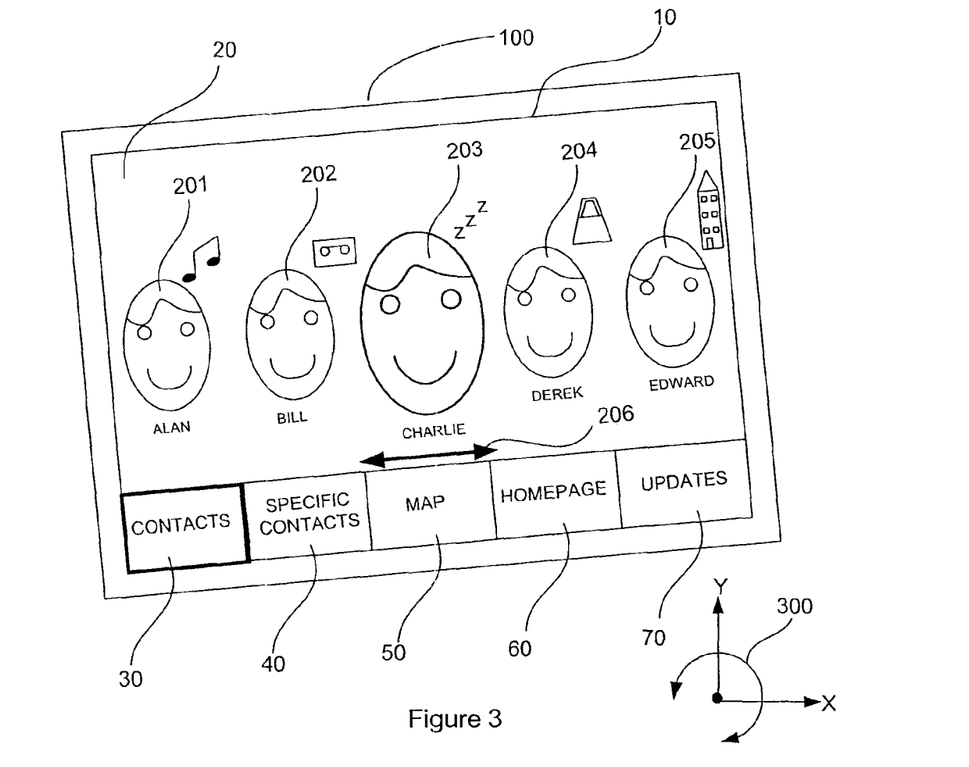
FIG. 3 shows a front view of a PDA according to an embodiment of the present invention on which a contacts screen is being displayed.

As shown in FIG. 3, when the contacts function of the PDA 100 is selected, all of the contacts available to the user of the PDA 100 are accessible via the main window 20. The contacts may be arranged in an appropriate order. For example, the contacts may be arranged in alphabetical order, as shown in FIG. 3.

A particular contact may be highlighted for selection by scrolling through the contacts in a particular manner, as with the specific contacts screen. For example, it may be possible to scroll through the contacts using a touch-sensitive input device (such as a touchpad). The touch-sensitive input device may be provided separately on the PDA 100, or may be incorporated into the main window 20. For example, the touch-sensitive input device could be a touchpad provided in the area shown by arrow 206 in FIG. 3.

Alternatively or additionally, it may be possible to scroll through the contacts shown in FIG. 3 by tilting the PDA 100. For example, it may be possible to scroll through the contacts by tilting the PDA 100 about the z axis, i.e. the axis perpendicular to the page of FIG. 3. In the embodiment shown in FIG. 3, the z axis (i.e. the axis about which the PDA 100 may be rotated in order to scroll through the contacts) is shown as being perpendicular to the display screen 10. Rotating the PDA 100 anticlockwise (i.e. about an axis pointing out of the page shown in FIG. 3, in the direction that the PDA 100 has been rotated from FIG. 1 to FIG. 3) may cause the contacts to rotate in one direction (e.g. from left to right), whereas rotating the PDA 100 in a clockwise direction (i.e. about an axis pointing into the page shown in FIG. 3) may cause the contacts to scroll in a different, or opposite, direction (e.g. from right to left). The specific contacts shown in the main window of FIG. 1 may also be scrolled through by tilting the PDA 100 in the manner described above.

The PDA 100 may be provided with a suitable tilt sensor in order to effect scrolling through the contacts when the PDA 100 is tilted or rotated, for example about an axis perpendicular to the display screen 10. For example, a gyroscopic sensor may be used as a tilt sensor. Furthermore, the tilt sensor may be configured to determine the angle through which the PDA 100 has been rotated about the z axis (i.e. the angle from the neutral position, the neutral position being, for example, the position in which the side surfaces of the PDA 100 shown in FIG. 3 lie either in a vertical or a horizontal plane). This angle may then be used to determine the speed through which the contacts are scrolled. In some embodiments, the speed through which the contacts are scrolled may be associated with the rate of rotation of the PDA 100. This rate of rotation of the PDA 100 may be determined by a tilt sensor, such as a gyroscopic tilt sensor.

The PDA 100 may comprise a controller to process how the contacts are scrolled through by tilting the PDA 100. For example, the controller may convert the output of the tilt sensor to a rate of scrolling through the contacts.

As described above in relation to the specific contacts shown in FIG. 1, each contact in the contacts screen shown in FIG. 3 may be depicted by an avatar, a name, or both. Furthermore, the status of each contact may also be displayed in the main window 20 showing the contacts in a suitable manner. The status of the contacts may be displayed in the manner described above in relation to the specific contacts shown in FIG. 1.

Figure 4:
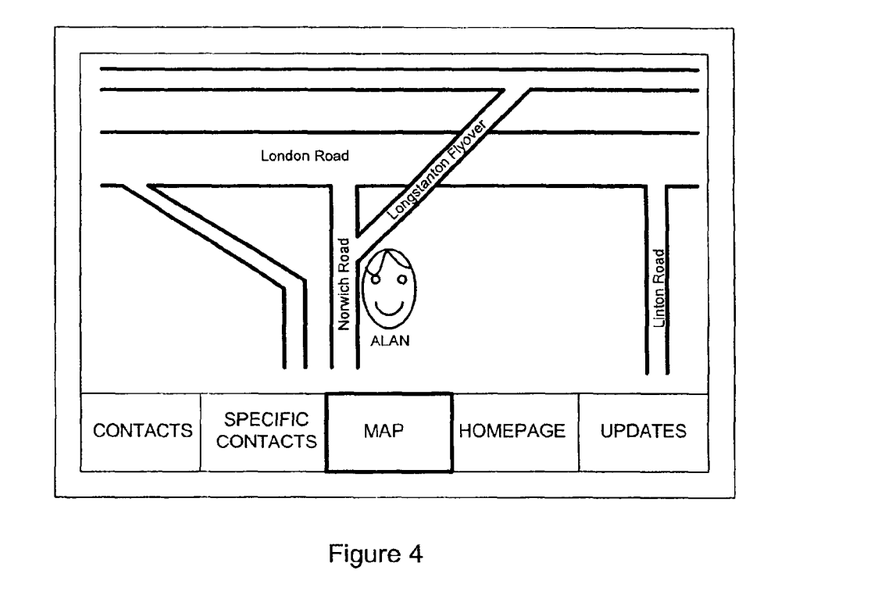
FIG. 4 shows a front view of a PDA according to an embodiment of the present invention on which a map showing the location of contacts is being displayed.

FIG. 4 shows the screen 10 of the PDA 100 when the map contacts function of the PDA 100 has been selected in an appropriate manner. As shown in FIG. 4, when the map contacts option of the PDA 100 has been selected, a map is displayed in the main window 20 showing the location on a map of one or more of the contacts. In the example shown in FIG. 4, the location of contact "Alan" is shown as being on the junction between "Norwich Road" and "Longstanton Flyover". This is indicated by the position of Alan's avatar on the map.

The location of other contacts who are not on the same map may be accessible by showing the contact (for example an avatar representing the contact) at a position on the map which is in the direction of their location. The contact can then be selected (for example by using a touch-sensitive input device, such as a touchpad) and the map may then scroll to the position of that contact.

In some embodiments it may be possible to scroll through the contacts available in the mapping mode in the same manner as described above in relation to the contacts screen.

The map contacts option may be accessed when, for example, either the contacts (as shown in FIG. 3) or the specific contacts (as shown in FIG. 1) screens are displayed in the main window 20. When the map contacts option is selected, the contact that is shown on the map may be the contact that was previously highlighted for selection in the manner explained above on either the specific contacts or the contacts main window. Typically, however, the map contacts option would be accessed when the specific contacts screen is being displayed. In this way, the contact that is shown on the map would be the highlighted specific contact. Furthermore, the contacts that are shown around the edge of the map (and which can thus be selected for viewing on the map) would be some or all of the remainder of the specific contacts.

The map contacts option may be accessed in any suitable manner. For example, the map contacts option could be selected by selecting the map contacts input area 50 of the screen 10. This could be done, for example, by using a touch-sensitive input device, which may or may not comprise the map contacts input area 50 itself.

In an embodiment of the invention, the map contacts option may be selected by tilting, or rotating, the PDA 100. For example, the map contacts option may be selected by tilting the PDA 100 about the x axis shown in FIG. 1. Thus, referring now to FIG. 5, in order to access the map contacts mode, the PDA 100 could be tilted from the substantially vertical position indicated as A, to the substantially horizontal position indicated as B (in position B, the PDA 100 is depicted with dashed lines, whereas in position A, the PDA 100 is depicted with solid lines). Thus, the specific contacts screen could occupy the main window 20 when the PDA 100 is in the substantially vertical position A, and when the PDA is then rotated about the x axis (i.e. an axis running substantially longitudinally through the PDA 100) to the position B shown in FIG. 5, the map contacts option would be shown in the main window 20. As described above, the contact shown on the map in the main window 20 would typically be the contact that was previously highlighted for selection in the specific contacts option in the main window 20.

The map contacts option may be accessed by rotating the PDA 100 through any suitable angle. Typically, the rotation would be about the x-axis shown in the figures (i.e. a horizontal axis, and/or an axis parallel to the plane of the longitudinal screen 10 of the PDA 100). However, any suitable axis for rotation could be chosen.

Figure 5:
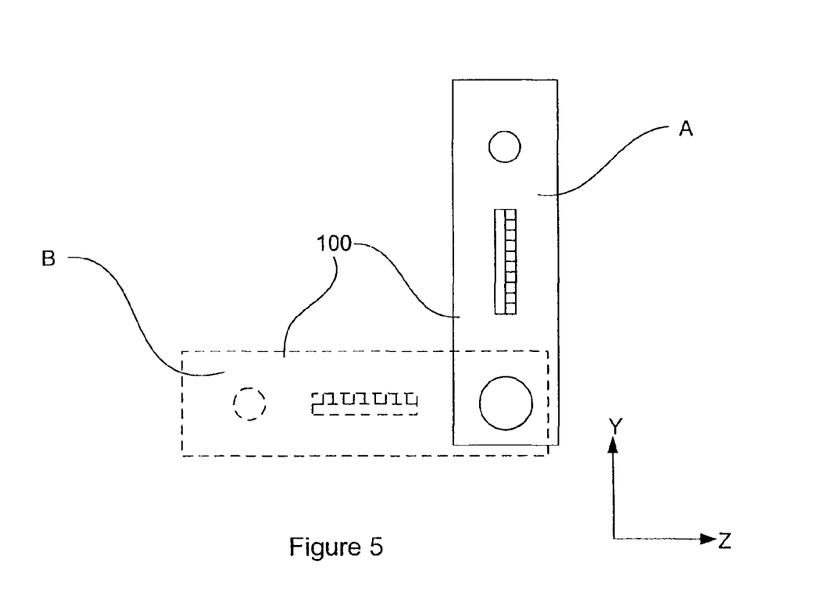
FIG. 5 shows a side view of a PDA according to an embodiment of the present invention showing tilting of the PDA in order to access a map screen.

It is not necessary in some embodiments to rotate the PDA 100 from a substantially vertical position shown as A in FIG. 5 in order to access the map. Furthermore, in some embodiments it is not necessary to rotate the PDA 100 to the substantially horizontal position indicated as B in FIG. 5 in order to access the map. Thus, if the angle between the horizontal and the plane of the PDA 100 (e.g. the plane defined by the screen 10 of the PDA 100) is defined as θ, then the value of $\theta_1$ at which the map contacts mode is activated (i.e. the angle below which the PDA 100 enters the map contacts mode), could be any suitable angle. For example, $\theta_1$ could be between: from 0° to 80°; from 10° to 70°; from 20° to 60°; or from 30° to 50°. The angle $\theta_1$ at which the map contacts option is activated could be 40°, or 45°.

In other embodiments, the map contacts screen may be accessed when the PDA 100 is rotated from a substantially horizontal position to a substantially vertical position.

The PDA 100 may comprise a controller which may be used to control any of the functions described herein relating to the map contacts option. For example, a controller may be used to, for example, convert an output from the tilt sensor to an instruction to display the maps contacts screen.

As explained above, once the map contacts mode, or option, has been activated, the user of the PDA 100 is presented with information indicating the location of one or more contacts on a map. This information can then be used by the user of the PDA 100 in making particular decisions. For example, the location of a particular contact may affect whether or not the user of the PDA 100 wants to get into contact with, or send information to, the particular contact shown on the map. Having a map function that is accessible simply by tilting, or rotating the PDA 100 means that the map function can be readily accessed by the user of the PDA 100 as required.

As stated herein, a PDA 100 according to an embodiment of the present invention may comprise a range of functionality. For example, the PDA 100 may comprise at least all of the functions known in typical PDAs available in the prior art. Thus, the PDA 100 may enable its user to perform any one or more of the following functions: viewing of video clips; viewing of photos; listening to music; accessing the internet; sending e-mails; acting as an electronic diary; performing GPS functions (such as providing the current location of the PDA 100); making telephone calls; sending text messages; playing games; and creating and storing spreadsheets and/or other documents.

Figure 6:
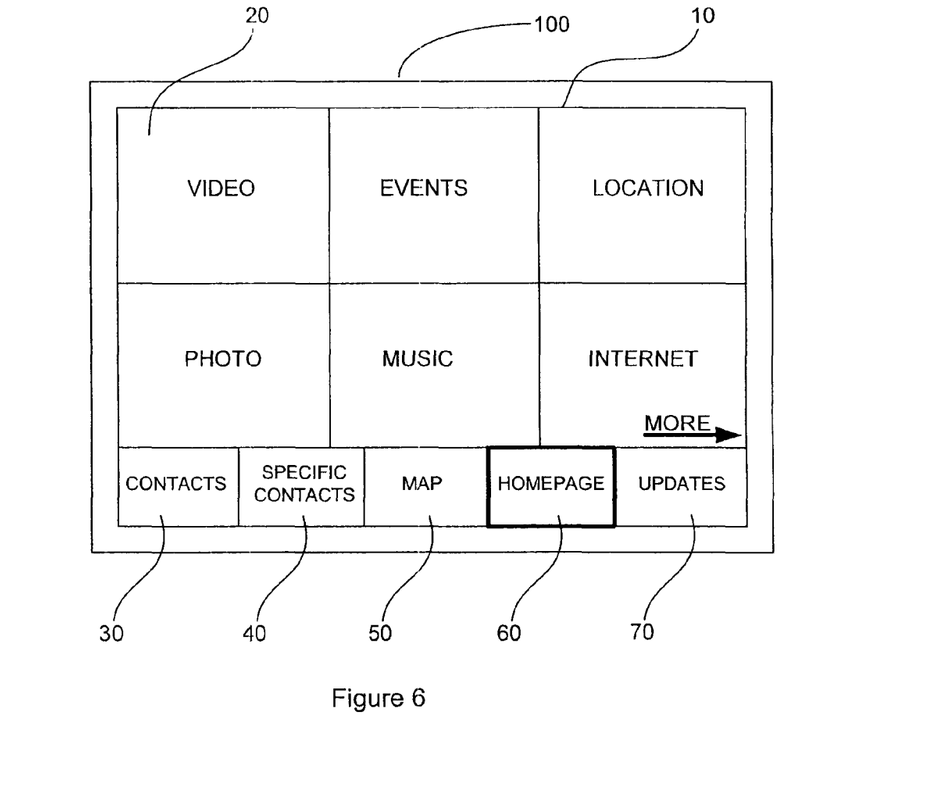
FIG. 6 shows a front view of a PDA according to an embodiment of the present invention on which a home page is being displayed.

The various functions that the PDA 100 can perform may be displayed on, and accessible via, a homepage 600 as shown in FIG. 6. The homepage 600 may be accessible from any other screen being displayed on display 10 of the PDA 100 by, for example, selecting the area 60 of the screen 10 relating to the homepage. This area 60 which provides access to the homepage 600 can be selected by a suitable means. For example, the area 60 could be selected by using a touch-sensitive input device, such as a touchpad. Once the homepage 600 has been accessed, the various functions of the PDA can be selected (for example using a touch-sensitive input device, such as a touchpad) for use by the user.

It will be understood that it is not necessary for a PDA 100 according to an embodiment of the present invention to use the precise menu structure and layout described herein in relation to the figures. For example, in some embodiments the menu structure may be at least partially layered. This may mean, for example, that a homepage (which may or may not be similar to that described in relation to FIG. 6) may be at the top of a hierarchal menu structure, and the various other screens (such as the contacts screen, the specific contacts screen, and the map contacts screen) may be arranged in at least one lower level of the hierarchal menu structure.

An explanation will now be provided of how the particular contacts may be selected, determined, or chosen for display on the specific contacts screen shown in the main window 20 of FIG. 1.

According to an aspect of the present invention, the PDA 100 may be configured to transmit, or transfer, status information about itself (for example using a transmitter which may comprise an antenna). This status information may be received by other devices. For example, the status details of the PDA 100 may be transmitted to, or transferred to, other electronic devices, for example other PDAs of the same or a similar type to PDA 100. Thus, it may be possible for other electronic devices (such as other PDAs 100) to receive certain status information from the PDA 100, and thus to know about its status.

Similarly, according to an aspect of the invention, the PDA 100 may be configured to receive or obtain (for example using a receiver which may comprise an antenna) status information relating to the status of other electronic devices, such as other PDAs which may or may not be of the same type as PDA 100. The PDA 100 may be further configured to then use the received/obtained status information, for example in the process of selecting which specific contacts should be displayed when the user of the PDA 100 selects the specific contacts option, as explained below.

In order to make status information from the PDA 100 available to other devices, the PDA 100 may be configured to send XML data as one or more RSS feeds to a server. The XML packets would typically contain the status information regarding the PDA 100. This status information could then be stored on a server. In order to access the status information of the PDA 100, other devices (such as other PDAs) may be configured to access the server and thereby access the status information regarding the PDA 100. The information could then be provided to one or more of the other devices from the server in the form of XML data, for example using an RSS feed. Similarly, the PDA 100 may be configured to access a server on which status information regarding other electronic devices (such as other PDAs 100) is stored using, for example, the method outlined above. In this way, the PDA 100 may be able to access status information regarding other devices (for example other PDAs 100).

In such an embodiment, each electronic device (for example PDA 100) that is connected to the server may have its own Uniform Resource Identifier (URI) on the server. This would enable an RSS feed (which may, for example, include location information about the electronic device) to be periodically retrieved from and/or sent to the server for an electronic device with a particular URI.

The server configured to receive the RSS feeds containing the status information about the PDA 100 may have a predetermined list of possible statuses for the PDA 100. In that case, the PDA 100 would then provide information to the server (for example via an RSS feed) stating which of the predetermined statuses it is currently in. Similarly, other devices (such as other PDAs 100) may be configured to provide information to the server regarding which predetermined state they are in.

The status of each of the devices whose status is logged on the server may be accessed at least by other devices, such as PDAs, whose statuses are logged on the server. As will be appreciated from the explanation regarding possible statuses below, it may be possible for one device (such as PDA 100) to have zero, one, or more than one status logged on the server at any given time.

Although an explanation has been provided above that relates to devices accessing each others' status information using XML packets on RSS feeds, it will be appreciated that any other method, technique and/or apparatus could be provided for allowing the PDA 100 to access status information of other devices, and for providing status information about itself to other devices.

Examples of status information that could be provided or accessed by the PDA 100 include information about what the PDA 100 is currently being used for; information about the location of the PDA 100; and power status information. For example, the status information could be whether the PDA 100 is being used to view videos (or particular types of videos); for listening to music (or a particular type of music); to view images (such as photos); to surf the internet; to send e-mails; to play games; or to make phone calls. The status information may additionally or alternatively relate to the location of the PDA 100. In this regard, as well as giving the geographical location (in terms of, for example, coordinates and/or longitude/latitude), the status information could also relate to whether the PDA 100 is at a predefined location specified by the user of the PDA 100, such as at home, or at work. The PDA 100 may determine its position using GPS, or any other suitable triangulation method. Furthermore, the status information may relate to whether the PDA is turned on; is currently active; or is in a sleep or hibernation mode.

It will be appreciated from the above examples of status information that the PDA 100 could be in, and provide information to other devices about, more than one status condition at any given time. For example, the PDA 100 could provide status information indicating that it is active; being used to listen to music; and is located at its home location at the same time.

The PDA 100 may be configured to recognise its own status (so as to be able to then provide this status information to other devices) in any suitable manner. In an embodiment, software maybe provided to determine its status. For example, the PDA 100 may be configured to recognise that it is being used to listen to music when it is being used to access and/or output a music file. Alternatively or additionally, status information may be determined by the PDA 100 using hardware. For example, the PDA 100 may be configured to recognise that it is being used to listen to music when headphones are plugged into the headphone socket 200 shown in FIG. 2.

The PDA 100 may be configured to access information about the status of other devices (such as other PDAs 100 of a similar or the same type) at any suitable time. For example the PDA 100 may be configured to obtain status information about other devices automatically at a predetermined time interval, such as once per day. Alternatively or additionally, the PDA 100 could be configured to obtain the status information about other devices (for example by accessing the server described above) when the user of the PDA 100 performs a specific function. For example, the PDA 100 could be configured to access status information regarding other devices when the PDA 100 is turned on or when the user selects a certain function or mode (such as entering the specific contacts screen). Alternatively or additionally, the PDA 100 may be configured such that the user of the PDA 100 can instruct information regarding other devices to be accessed on demand.

The status information regarding other devices may be used by the PDA 100 in various different ways and for various different reasons. One example of the use of the status information is in determining which of the contacts of the user of the PDA 100 should be displayed at any one time as specific contacts, i.e. which of the user's contacts should be displayed and/or accessible when the specific contacts screen is accessed by the user.

The specific contacts displayed by the specific contacts screen of the PDA 100 can thus be determined on the basis of the status of the PDA 100 itself and/or the status of devices belonging to contacts of the user of the PDA 100 at any given time. For example, the PDA 100 could be configured such that different contacts are displayed depending on its location (as determined through, for example, GPS). For example, when the PDA 100 is at its user's work location, a specific, predetermined, list of work contacts could be displayed as the specific contacts. These contacts could be, for example, contacts who work with the user of the PDA 100, or who often need to be contacted for work reasons.

Alternatively or additionally, the PDA 100 may be configured to actively select the specific contacts on the basis of its own status. For example, the PDA 100 may be configured such that, when it is at a work location, it searches each of the contacts in the address book of the user of the PDA 100 and accesses information relating to the status of those contacts (using, for example, the technique and apparatus described above) in order to determine if those contacts are also at work. Those contacts whose device status indicates that they are at work may then be displayed as the specific contacts in the PDA 100. In the example screen shown in FIG. 1, it may be that all of the contacts represented by avatars 201-205 are at work, and so is the user of the PDA 100.

Thus, the PDA 100 may be configured to display a pre-determined list of specific contacts and/or an active list (i.e. determined by the PDA 100 using the status information that it has obtained about other devices) as specific contacts. Whether an active list or a predetermined list is displayed may depend on, for example, user preference.

By way of further example, if the PDA 100 is being used to listen to music, then the specific contacts of the PDA 100 could be selected appropriately. For example, the PDA 100 may be configured such that when it is being used to listen to music, a predetermined list of specific contacts (for example those contacts who particularly like music, or particularly like the genre of music being output by the PDA 100) could be displayed as the specific contacts. Alternatively or additionally, if the PDA 100 is being used to listen to music, then the PDA 100 may be configured to use status information that it has obtained about other devices in order to generate an active list of specific contacts. For example, the list of specific contacts may contain those contacts who are currently listening to music, or currently listening to music of a specific genre.

By way of a still further example, the PDA 100 may be configured such that when the map contacts mode is selected (for example by tilting or rotating the PDA 100), a map showing the location of a predetermined number of the geographically closest contacts is displayed, for example, a map showing the closest two, five, ten or 20 contacts may be displayed.

The specific contacts may be related to, for example, an internet search that the user of a PDA 100 is performing. For example, if the user of the PDA 100 is searching for a particular service (such as a restaurant, or a particular type of shop), then the specific contacts list could include those contacts who have posted a review of that particular service, for example on the internet.

By way of still further example, the specific contacts could be related to groups with which the user of the PDA is registered. For example, if the user of the PDA 100 is registered with a photography club, then if the PDA 100 is used to take a photograph, the specific contacts could be users of electronic devices who are also members of a photography club. This would make sending the photograph to the other members of the club easier, if so desired.

The steps of receiving status information from other electronic devices, comparing the status information of the other electronic devices with the status of the PDA 100, and determining the list of specific contacts based on the comparison may be performed using a processor contained within the PDA 100.

The specific contacts displayed by the specific contacts screen of the PDA 100 may be updated over time. For example, as the user continues to listen to music, other users may begin to listen to music, and some users who were originally listening to music may stop listening to music. This changing status of the various contacts could be updated by changing the list of specific contacts over time. Alternatively, the PDA 100 may be configured such that the list of specific contacts that is generated each time the status of the PDA 100 changes is then fixed until the status of the PDA 100 next changes.

Thus, the specific contacts list provides the user of the PDA 100 with easy access to a list of those contacts with whom they would most likely want to contact at any given time.

The invention claimed is:

1. A handheld electronic device with an interface configured to connect to a network, the handheld electronic device comprising:
   a screen configured to display information to a user of the handheld electronic device; and
   circuitry configured to:
      determine a location of the handheld electronic device;
      determine at least one function performed by the handheld electronic device; and
      receive status information relating to one or more users of other electronic devices, the status information comprising information indicating the geographical location of other electronic devices,
   wherein the circuitry of the handheld electronic device is further configured to:
      determine one or more users of other electronic devices connected to the network, which have a potential for the user of the handheld electronic device to be interested in contacting, the determination being based on whether the geographical location information of the respective other electronic devices of the one or more other users corresponds to the determined location of the handheld electronic device;
      generate an updated one or more determined users of other electronic devices in response to a change in geographical location of other electronic devices; and
      control display on the screen of information relating to the updated one or more determined users of the other electronic devices, the information relating to the updated one or more determined users including a respective user name, a graphical representation corresponding to the user, and status information so as to indicate the updated one or more determined users as being users which have a potential for the user of the handheld electronic device to be interested in contacting, the updated one or more determined users being based on whether an updated geographical location of the respective other electronic devices of the one or more determined users corresponds to a determined location of the handheld electronic device.

2. The handheld electronic device according to claim 1, wherein the circuitry is further configured to control the display on the screen of the handheld electronic device to display the geographical location of the respective other electronic devices of the updated one or more determined users.

3. The handheld electronic device according to claim 2, wherein the circuitry is further configured to
- determine a position of the handheld electronic device relative to a position of the one or more determined users of other electronic devices, and
- control the display on the screen of the handheld electronic device to display the position of the handheld electronic device relative to the position of the one or more determined users of other electronic devices.

4. The handheld electronic device according to claim 3, wherein the circuitry is further configured to control the display on the screen of the handheld electronic device to display the geographical location of the respective other electronic devices of the updated one or more determined users on a map.

5. The handheld electronic device according to claim 3, wherein the circuitry is further configured to control the display on the screen of the handheld electronic device to display a predetermined number of closest, with respect to a relative distance to the handheld electronic device, geographical locations of the respective other electronic devices of the updated one or more determined users on a map.

6. The handheld electronic device according to claim 5, wherein the predetermined number of closest, with respect to the relative distance to the handheld electronic device, geographical locations of the respective other electronic devices of the updated one or more determined users displayable on a map is two, five, ten or twenty.

7. The handheld electronic device according to claim 1, wherein the circuitry is further configured to control the display on the screen of the handheld electronic device to display on a map the geographical location of one of the one or more determined users in response to selecting that user for display.

8. The handheld electronic device according to claim 1, wherein the circuitry is configured to receive said status information relating to the one or more users of the other electronic devices from a server.

9. The handheld electronic device according to claim 1, wherein the at least one function includes at least one of:
- displaying videos;
- displaying photographs;
- taking photographs;
- playing music;
- sending emails;
- accessing the internet;
- playing games; and
- acting as a telephone.

10. The handheld electronic device according to claim 1, wherein the status information of the respective other electronic devices also indicates a power status of the electronic device of the determined user.

11. The handheld electronic device according to claim 1, further comprising one of hardware and software configured to determine a status of the handheld electronic device, the status of the handheld electronic device indicating a power status of the handheld electronic device.

12. The handheld electronic device according to claim 1, wherein the circuitry is further configured to transmit status information about the handheld electronic device.

13. The handheld electronic device according to claim 12, wherein the circuitry is further configured to transmit status information about itself to a server.

14. The handheld electronic device according to claim 1, wherein the circuitry is further configured to re-determine the one or more users of other electronic devices which have a potential for the user of the handheld electronic device to be interested in contacting, when the status of the handheld electronic device changes.

15. A method comprising:
- retrieving a determined location of a handheld electronic device;
- determining at least one function performed by the handheld electronic device;
- receiving status information relating to one or more users of other electronic devices, the status information comprising information indicating the geographical location of the one or more other electronic devices;
- determining one or more users of other electronic devices which have a potential for a user of the handheld electronic device to be interested in contacting, the determination being based on whether the geographical location information of the respective other electronic devices of the one or more other users corresponds to a the determined location of the handheld electronic device;
- generating an updated one or more determined users of other electronic devices in response to a change in geographical location of other electronic devices; and
- controlling display on a screen of the handheld electronic device of information relating to the updated one or more determined users of the other electronic devices, the information relating to the updated one or more determined users including a respective user name, a graphical representation corresponding to the user, and status information so as to indicate the updated one or more determined users as being users which have a potential for the user of the handheld electronic device to be interested in contacting, the updated one or more determined users being based on whether an updated geographical location information of the respective other electronic devices of the one or more other users corresponds to a determined location of the handheld electronic device.

16. The method according to claim 15, further comprising controlling the display on the screen of the handheld electronic device to display the location of the determined one or more users on a map.

17. The method according to claim 16, further comprising controlling the display on the screen of the handheld electronic device to display the location of the handheld electronic device relative to the updated one or more determined users of the other electronic devices.

18. The method according to claim 15, further comprising receiving, by the handheld electronic device; the status information relating to the one or more users of the other electronic devices from a server.

19. The method according to claim 15, further comprising transmitting, by the handheld electronic device, status information about the handheld electronic device.

20. The method according to claim 19, wherein the transmitting transmits the status information to a server.

21. The method according to claim 15, further comprising re-determining the one or more users of other electronic devices which have a potential for the user of the handheld electronic device to be interested in contacting, in response to the status of the handheld electronic device changing.

22. The method according to claim 15, wherein the method steps are performed by the handheld electronic device.

23. A non-transitory computer-readable medium including computer executable instructions, which when executed by a computer, cause the computer to perform a method, the method comprising:
  determining a current location of a handheld electronic device;
  determining at least one function performed by the handheld electronic device;
  receiving status information relating to one or more users of other electronic devices, the status information comprising information indicating the geographical location of other electronic devices;
  determining one or more users of other electronic devices which have a potential for a user of the handheld electronic device to be interested in contacting, the determination being based on whether the geographical location information of the respective other electronic devices of the one or more other users corresponds to a the determined location of the handheld electronic device;
  generating an updated one or more determined users of other electronic devices in response to a change in geographical location of other electronic devices; and
  controlling display on a screen of the handheld electronic device of information relating to the updated one or more determined users of the other electronic devices, the information relating to the updated one or more determined users including a respective user name, a graphical representation corresponding to the user, and status information so as to indicate the updated one or more determined users as being users which have a potential for the user of the handheld electronic device to be interested in contacting, the updated one or more determined users being based on whether an updated geographical location information of the respective other electronic devices of the one or more other users corresponds to a determined location of the handheld electronic device.

* * * * *